Patented May 17, 1932

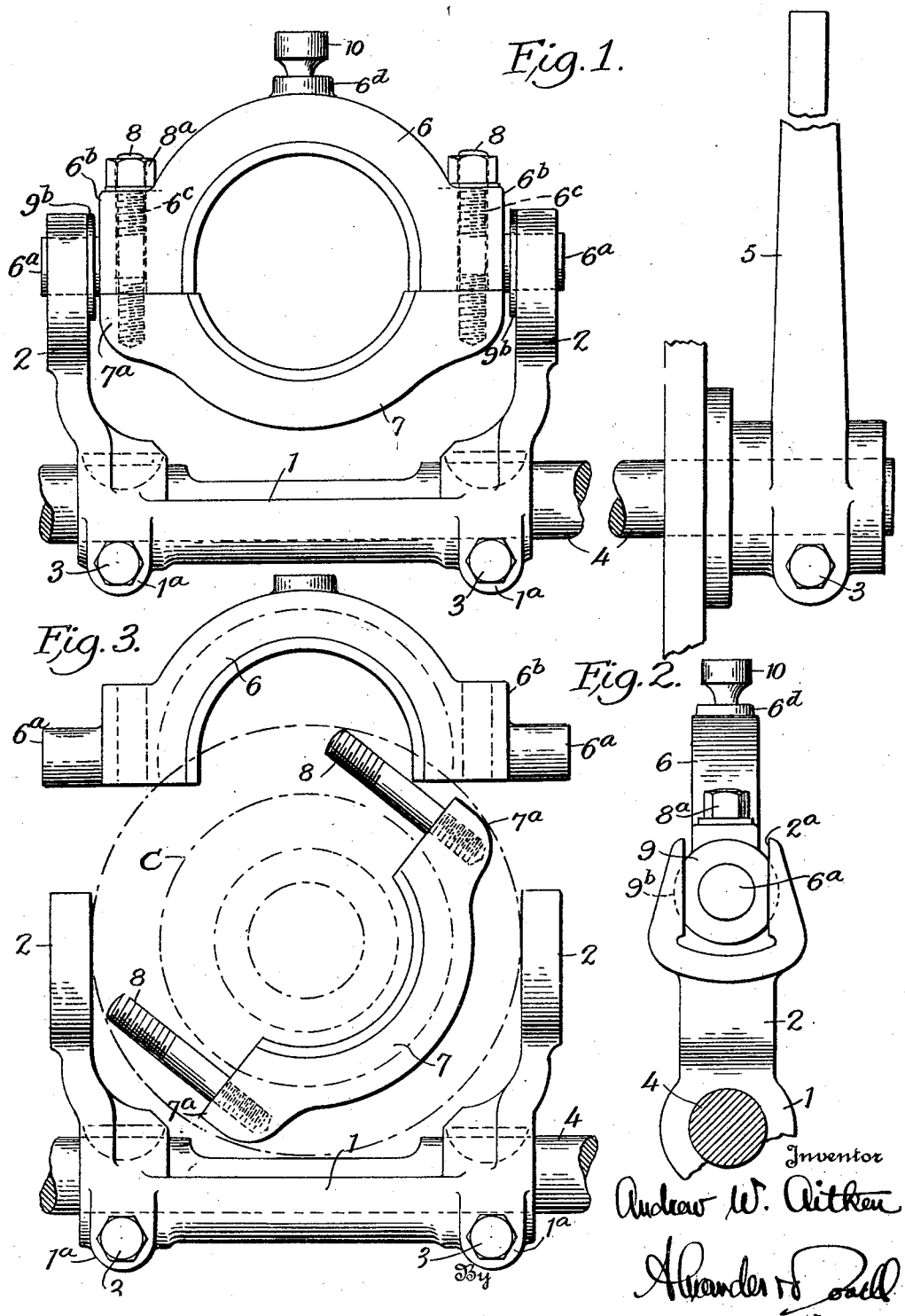

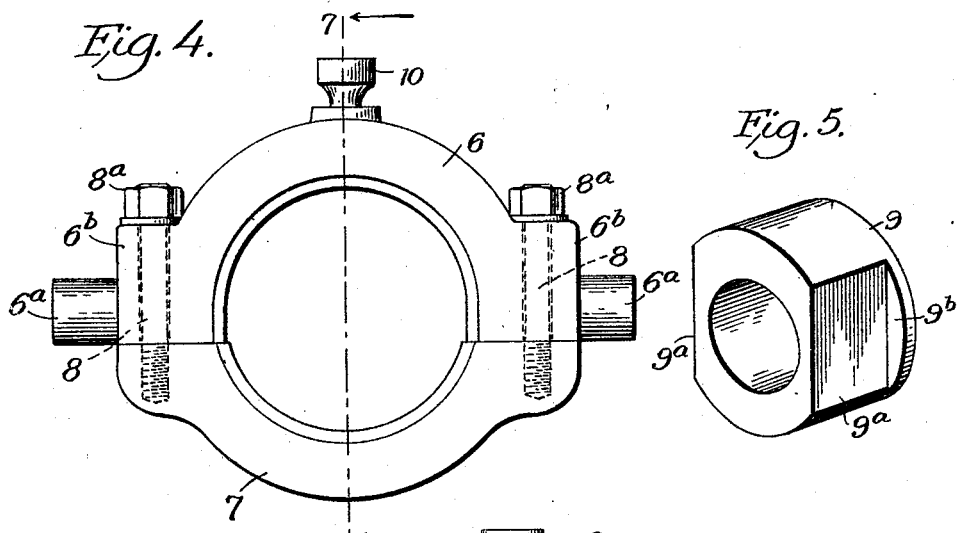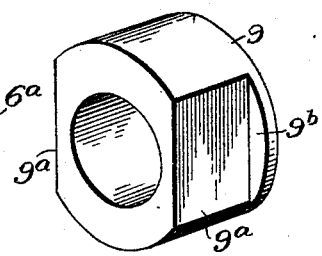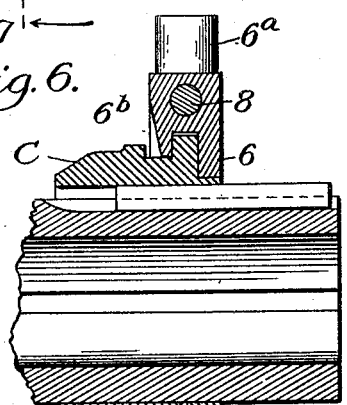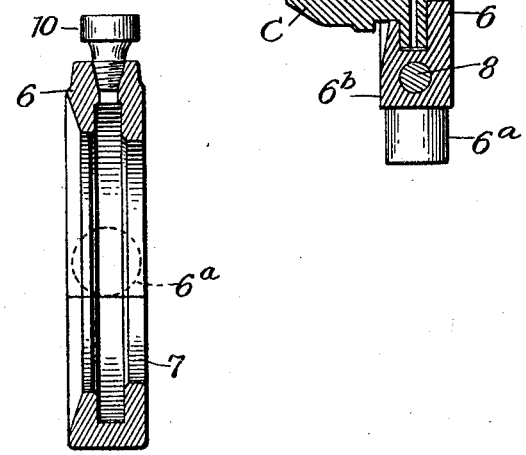

1,858,947

UNITED STATES PATENT OFFICE

ANDREW W. AITKEN, OF SPRINGFIELD, OHIO, ASSIGNOR TO THE BUFFALO-SPRINGFIELD ROLLER CO., OF SPRINGFIELD, OHIO, A CORPORATION OF OHIO

CLUTCH COLLAR

Application filed April 24, 1931. Serial No. 532,665.

This invention is a novel improvement in clutch collars of the divided annular ring type adapted to surround the shiftable clutch cone or hub and to take the thrust of the cone or hub when engaging and disengaging the clutch.

The principal object of the invention is to provide a simple and novel clutch collar designed to permit ready removal from its cone or hub, consisting of two complementary substantially semi-annular sections adapted to be bolted together around the cone or hub. The upper section is provided with diametrically opposed trunnions having bearings in the arms of the clutch shifting fork, and the lower section is provided with studs adapted to be bolted through perforated lugs adjacent the trunnions of the upper section, whereby when it is desired to remove the collar it is only necessary to remove the nuts from the studs which hold the two sections together and to lift the upper section with its trunnions from the bearings in the fork arms, and to partially rotate the lower section around the cone or hub until same can be removed between the arms of the fork. No other parts of the clutch assembly need be disturbed.

Clutch collars require frequent replacement because of hard usage and wear due to thrust, and in removing clutch collars of the type now in general use it has heretofore been necessary to remove the clutch fork: but before this could be done, the clutch shaft had to be removed; and often other parts had to be removed to permit removal of the shaft. The performance of such operations was laborious, and my novel clutch collar is designed to facilitate removal and replacement thereof.

I will explain the invention with reference to the accompanying drawings which illustrate one practical embodiment thereof to enable others to adopt and use the same; and will summarize in the claims the novel features in the construction, and novel combinations of parts, for which protection is desired.

In said drawings:

Fig. 1 is a plan view of my novel clutch collar mounted in the fork arms for operation by the clutch shaft;

Fig. 2 is a side elevation of the clutch collar and fork;

Fig. 3 is a view similar to Fig. 1 but showing the method of removing the halves of the collar from the fork and from the clutch cone or hub (which is shown in dot and dash lines);

Fig. 4 is an enlarged plan view of the clutch collar detached;

Fig. 5 is a perspective view of the trunnion bushing;

Fig. 6 is a longitudinal section through the collar and adjacent parts of the cone or hub looking towards the trunnions;

Fig. 7 is a section on the line 7—7 of Fig. 4;

As shown, the clutch throw-out yoke preferably comprises a split tubular member 1 of desired length provided with pairs of opposed perforated lugs 1a at opposite sides of the split for receiving the bolts 3 whereby the yoke may be securely clamped to the clutch shaft 4, which shaft is mounted in suitable bearings in the vehicle or other frame, and may be operated by means of a lever 5 keyed or otherwise secured to the shaft. Member 1 carries parallel arms 2, 2 at its ends, said arms 2 having open bearing slots 2a at their outer ends having parallel walls for receiving the sliding bushings 9 for the trunnions 6a as shown in Fig. 2.

The clutch collar preferably comprises a divided annular ring substantially U-shaped in cross-section, said ring being made in two complementary substantially semi-circular sections 6 and 7 adapted to be bolted together. The upper section 6 is provided at each end with thickened lugs 6b, perforated as at 6c, to receive the studs 8 carried by the lower half 7 whereby the halves may be bolted together. Extending beyond the lugs 6b are the diametrically opposed trunnions 6a adapted to engage the bushings 9 in the bearing slots 2a of yoke arms 2. The lower section 7 is substantially the same as the upper section 6, except that the trunnions are omitted.

Extending upwardly from the thickened end portions 7a of lower section 7 are studs 8 secured thereto in any desired manner, whereby when the sections 6 and 7 are assembled the studs 8 will extend upwardly through the bores 6c in the thickened end portions 6b of section 6 sufficiently to permit placing nuts 8a thereon, whereby the sections 6 and 7 may be securely bolted together. The sections 6 and 7 may be detachably attached together in any other desired manner.

The upper section 6 extends through an arc somewhat greater than the 180°, i. e., a distance at each end equal to half the diameter of the trunnions 6a, and the arcuate length of lower section 7 is accordingly lessened a corresponding amount. Since the arcuate length of section 6 is greater than 180° the distance between the inner peripheries at the lower ends of the section 6 is constant from points on the axis of trunnions 6a to the outer lower faces of the section, or somewhat greater than the diameter of the cone or hub C, to permit removal of the section therefrom. The split between the two halves 6 and 7 as shown is preferably in a plane tangent to the lower peripheries of the trunnions 6a. The thrust faces of the sections 6 and 7 may be machined in any desired manner to suit the contour of the cone or hub C (see Fig. 6) upon which the assembled collar is mounted.

Trunnions 6a are preferably provided with bushings 9 slidably engaging the bearing slots 2a in the ends of forks 2 as shown in Fig. 2, the bushings 9 being cylindrical and of diameter greater than the distance between the side walls of the bearing slots. Diametrically opposed flattened portions 9a (Fig. 5) are machined or otherwise formed at opposite sides of the outer surface of each bushing 9, extending from one end thereof to a point adjacent the other end, said flattened portions 9a being parallel and adapted to slidably engage the parallel side walls of bearing slots 2a as the yoke is swung. The opposed exterior flanges 9b on each bushing 9 are adapted to engage the inner faces of the arms 2, the flanges being interposed between the arms 2 and the thickened end portions 6b and 7a of the sections 6 and 7.

The collar may be lubricated when assembled upon the cone or hub by means of a centrally disposed oil cup 10 or the like threaded into an enlarged central boss 6d on the outer periphery of the upper section 6, said boss communicating with the channel in the collar.

When it is desired to remove the collar from the cone or hub C for replacement due to wear or other causes, same may be readily removed without disturbing any other parts of the clutch assembly, by merely removing the nuts 8a from studs 8 thereby permitting the lower section 7 of the collar to drop away from the upper section 6. The upper section 6 may then be lifted out (Fig. 3) of its bearing slots 2a in the yoke arms 2 without necessitating separation of the yoke arms 2 or removal of the yoke arms from the shaft 4. The lower section 7 may then be removed by partially rotating same about the cone or hub C as shown in Fig. 3 until it may be withdrawn from between the fork arms 2. No other members of the clutch assembly need be disturbed.

I do not limit my invention to the exact form shown in the drawings for obviously changes may be made therein within the scope of the claims.

I claim:—

1. A clutch collar comprising complementary sections, one of the sections having opposed trunnions extending therefrom; and all parts of the other section lying within a pitch circle of less diameter than the distance between the inner ends of the trunnions; and means for detachably attaching the sections together.

2. A clutch collar comprising complementary substantially semi-annular sections, one of the sections having opposed trunnions extending diametrically from opposite ends thereof; and all parts of the other section lying within a pitch circle of less diameter than the distance between the inner ends of the trunnions; and means for detachably attaching the sections together.

3. A clutch collar comprising complementary substantially semi-annular sections having their meeting ends enlarged and means associated with the enlarged ends for detachably attaching the sections together; one of the sections having opposed trunnions extending diametrically from the enlarged ends thereof; and all parts of the other section lying within a pitch circle of less diameter than the distance between the inner ends of the trunnions.

4. A clutch collar comprising complementary substantially semi-annular sections having their meeting ends enlarged and means at the enlarged ends for detachably attaching the sections together; one of the sections having diametrically opposed trunnions extending from the opposite ends thereof, and all parts of the other section lying within a pitch circle of less diameter than the distance between the inner ends of the trunnions; and the split between the sections being in a plane substantially tangent to the outer peripheries of the trunnions.

5. A clutch collar comprising complementary substantially semi-annular sections; the meeting ends of the sections being enlarged; diametrically opposed trunnions extending from the opposite enlarged ends of one section, studs on the enlarged ends of one section adapted to be bolted through bores in the enlarged ends of the other section; and all parts of the other section lying within a pitch circle of less diameter than the distance between the inner ends of the trunnions.

6. In a clutch assembly including a shiftable cone and a shifting yoke provided with arms disposed in opposite sides of the cone; a thrust collar surrounding said cone, said collar comprising complementary substantially semi-annular sections, the section opposite the yoke carrying diametrically opposed trunnions engaging the arms, and the other section being detachably attached with the first section; whereby the collar may be removed by detaching the sections and without disturbing other parts of the assembly.

7. In a clutch assembly including a shiftable cone and a shifting yoke provided with arms disposed on opposite sides of the cone; a thrust collar around said cone, said collar comprising complementary substantially semi-annular sections, the section opposite the yoke carrying diametrically opposed trunnions engaging the arms, and the other section having its ends detachably bolted to the first section adjacent the trunnions, whereby the collar may be removed by detaching the sections and without disturbing other parts of the assembly.

8. In a clutch assembly, a clutch cone, a shifting yoke provided with arms at opposite sides of the cone having open bearings at their outer ends; a thrust collar surrounding the cone comprising two complementary sections; the section further removed from the yoke carrying opposed trunnions engaging the open bearings, and the other section being detachably connected to the first section whereby the collar may be removed by detaching the sections and without disturbing other parts of the assembly.

9. In an assembly as set forth in claim 8, all parts of the other section lying within a pitch circle of less diameter than the distance between the yoke arms, whereby the said section when detached may be rotated around the collar between the yoke arms.

10. In a clutch assembly, a clutch cone, a clutch shaft, a shifting yoke on said shaft provided with arms at opposite sides of the cone having open bearings at their outer ends; a thrust collar surrounding the cone comprising two detachable complementary sections; the section further removed from the shaft carrying opposed trunnions engaging the open bearings, and all parts of the other section lying within a pitch circle of less diameter than the distance between the yoke arms whereby said section may be rotated around the collar between the yoke arms for removal from the assembly without disturbing the yoke or shaft.

11. In a clutch assembly, a clutch cone, a clutch shaft, a shifting yoke on said shaft provided with arms at opposite sides of the cone having open bearings at their outer ends; a thrust collar surrounding the cone comprising two complementary sections, the section further removed from the clutch shaft carrying opposed trunnions engaging the open bearings, and the other section being detachably connected to the first section adjacent the trunnions; all parts of the yoke and shaft lying wholly outside of a pitch circle of diameter equal to the distance between the inner ends of the trunnions, whereby when the first section is removed the other section may be rotated around the collar between the yoke arms for removal without interference by the yoke or clutch shaft.

ANDREW W. AITKEN.